United States Patent
Scarpa

(10) Patent No.: US 9,431,154 B1
(45) Date of Patent: Aug. 30, 2016

(54) HEAT RESISTANT SELF EXTINGUISHING COMMUNICATIONS CABLE AND CORD

(71) Applicant: Timothy Allen Scarpa, Alstead, NH (US)

(72) Inventor: Timothy Allen Scarpa, Alstead, NH (US)

(73) Assignee: Whitney Blake, Co., Bellows Fall, VT (US)

( * ) Notice: Subject to any disclaimer, the term of this patent is extended or adjusted under 35 U.S.C. 154(b) by 0 days.

(21) Appl. No.: 14/998,410

(22) Filed: Jan. 4, 2016

Related U.S. Application Data

(63) Continuation-in-part of application No. 14/121,910, filed on Nov. 3, 2014.

(51) Int. Cl.
| | |
|---|---|
| *H01B 7/29* | (2006.01) |
| *H01B 7/295* | (2006.01) |
| *H01B 3/28* | (2006.01) |
| *H01B 7/06* | (2006.01) |
| *C08J 3/20* | (2006.01) |

(52) U.S. Cl.
CPC ............... *H01B 7/292* (2013.01); *C08J 3/203* (2013.01); *H01B 3/28* (2013.01); *H01B 7/065* (2013.01); *H01B 7/295* (2013.01); *C08J 2311/00* (2013.01); *C08J 2423/06* (2013.01)

(58) Field of Classification Search
USPC ...................................................... 174/121 A
See application file for complete search history.

(56) References Cited

U.S. PATENT DOCUMENTS

| | | | | |
|---|---|---|---|---|
| 3,571,490 | A * | 3/1971 | Bunish ................ | H01B 7/295 174/110 R |
| 2008/0266448 | A1* | 10/2008 | Reiner ................ | H04N 5/2251 348/376 |
| 2012/0082422 | A1* | 4/2012 | Sarchi ................ | G01K 11/32 385/101 |

\* cited by examiner

*Primary Examiner* — William H Mayo, III
*Assistant Examiner* — Krystal Robinson
(74) *Attorney, Agent, or Firm* — Stephen W. White

(57) ABSTRACT

Heat resistant and flame retardant self-extinguishing cables and cords made with wires containing a special surrounding material used with portable communications equipment that must be able to operate in extremely hostile environments such as a fire so as to allow continual communications. These fire and heat resistant cables and cords are comprised of a special mixture of materials to manufacture a protective element to surround the communication wires.

4 Claims, 3 Drawing Sheets

US 9,431,154 B1

HEAT RESISTANT SELF EXTINGUISHING COMMUNICATIONS CABLE AND CORD

CROSS REFERENCE TO RELATED APPLICATIONS

This Continuation-in-Part application is based on my previously filed Provisional Patent No. 61/964,542 dated Jan. 9, 2014 and U.S. Letters patent application Ser. No. 14/121,910 filed Nov. 3, 2014, the basis on which this application relies and incorporates herein.

BACKGROUND OF THE INVENTION

1. Field of the Invention

This invention relates to communications equipment and more specifically to communications equipment that is used by emergency and other responders such as first responders, fire fighters and the like. This invention also relates to a reliable communications system that can be accessed by the aforementioned first responders during time when such are subject to high temperatures such as fires. This invention also relates to a communications cable and/or cord that connect such a communications system to the mouthpiece employed by the first responders when extra help might be needed under unsafe high temperature produced, for example, by heat and fire conditions. This invention also relates to a formula that can provide a coating over the cables such that it is not only fire retardant but self-extinguishing.

2. Discussion of the Prior Art

It is well-known that emergency and other responders who are usually requested to ensure the safety of people, especially those associated with the fire-fighting teams, must often enter dangerous areas and must be in contact with the rest of the team as well as those on the outside in case help might be needed. This is especially so when fire-fighters enter a burning building in order to rescue those who might be occupying the facility or other fire-fighters also within the building. They often face fierce conditions of fire and smoke and need to be in constant contact with other members of the team and those who might need to apply fire-fighting material as requested. These conditions often lead those who must enter in a confusing state unable often to tell up from down or where the nearest exit might be. First responders and the firefighters mentioned herein know exactly how their communications systems are supposed to work. Fire departments need communications systems that are reliable especially within a large, dense down-town area, in high-rise buildings with lots of concrete and steel and one that operates well in rural areas with varying terrains. The radio system here is a lifeline for the people who put their lives on the line in a daily basis. Thus, communications applied in these instances are of the upmost importance.

Communications used conventionally by first responders and the police are usually portable communications equipment attached to the responder and usually protected by the fire resistant clothing of the fire-fighters, for example. In many instances, however, the microphone, which must be close to the user's mouth, is more exposed and the cord or cable that connects the microphone to the portable communications equipment is also exposed. It is vital that the first responder be in touch with any other first responder so that the can communicate quickly and provide any vital help quickly. For example, if a fire-fighter enters a burning building and finds him or her in a risky place, they might need to call for help or for the direction of additional water or other fire-fighting material and thus the need for the communications equipment is more than vital. If the heat and flames of the fire, directly affects anything outside of the fire-resistant clothing or other protective gear, then the use of the instrument or equipment may be lost. As mentioned above, normally, the cord or cable that connects the microphone to the communications equipment is located outside of the clothing and might be exposed to high heat and flames thus must resist such heat and ignition from exposure to flames in order to remain serviceable.

SUMMARY OF THE INVENTION

Although the need is great for flame retardant and heat-resistant elements within the first responder's communications systems, no one to date has been able to give such resistance for use within a fire containing building or the like. Thus, the risks to first responders still exist and if the fire burns hotly they might not be able to communicate with other responders or those outside to give them aide. Thus, there is a pressing need to provide adequate fire protected communication systems that will permit fire responders such as fire, rescue and police the ability to communicate with all others under fire and heat containing areas of practice. These and yet other needs can be accomplished by providing cable or cord connector elements that are attached to a communications system at one end and a microphone or other voice transmitting device on the other end whereby said cable or cord connector comprises a series of wire transmitting systems each of said wire being enclosed within an insulating layer, and an optional layer of a tightly wound metallic closely formed wire shield is formed around all of the series of wires followed by a novel polychloroprene rubber-type layer surrounding said sheath and all of said wire systems. There is also a pressing need to improve on the past formulation such that the elements treated to resist fire will also have some level of extinguishment when it comes to flames generated thereon.

BRIEF DESCRIPTION OF THE DRAWINGS

The FIGS. 1-3 attached to this specification show unique and special elements within the metes and bounds of this invention but are not necessarily exemplary of all and every element that might be included herein.

DETAILS OF THE INVENTION

Figure 1:
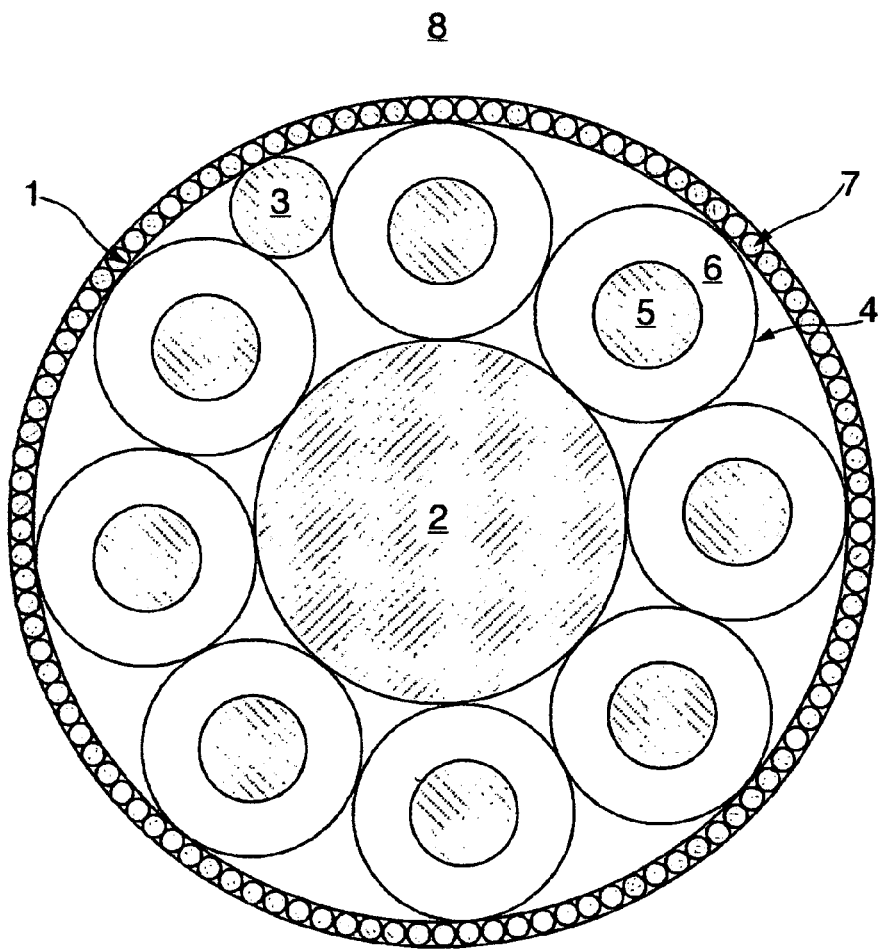
FIG. 1 is a cross-section showing of a typical cord or cable to be used within this invention.

Looking now closely at the 3 drawings included with this specification and details, FIG. 1 shows a cross-section of a typical cord or cable used within the ambit of this invention. In this showing, wherein 8 internal communication wires are shown enclosed within an external covering 1 which is a polychloroprene rubber-like material modified as described herein within this specification. A filler element 2 is shown preferably in the center but may be located elsewhere within the cable core in order to keep the various wires closely aligned with the covering 1. A ground 3 is also shown. One of the wires 4 is shown with a copper wire 5 interior and an insulating layer of heat-resistant plastic 6 covering said wire 5. One of a series of tightly wound wire is shown at 7 and these wires wind all around the internal core of the series of said wires. Shown as insulating all of the above a layer of polychloroprene is shown as 8. The total number of wires within this system will be dictated by the requirements of the communications system it serves. This dictation is determined by the number of contacts that may be included within any system. Optionally we prefer that the tightly wound wires exemplified by 7 be present in sufficient quantity so as to form a shield that will protect at least 90% of the surface of the inside of the wire system. Added to the shield effectiveness of my novel polychloroprene coating, this will provide the heat and fire protection adequate to survive continuous temperature extremes of −22° F. to 140° F. and intermittent short term temperatures in a test procedure up to 500° F. This new formulation is also capable of extinguishing fire that may occur directly on the coating itself.

Figure 2:
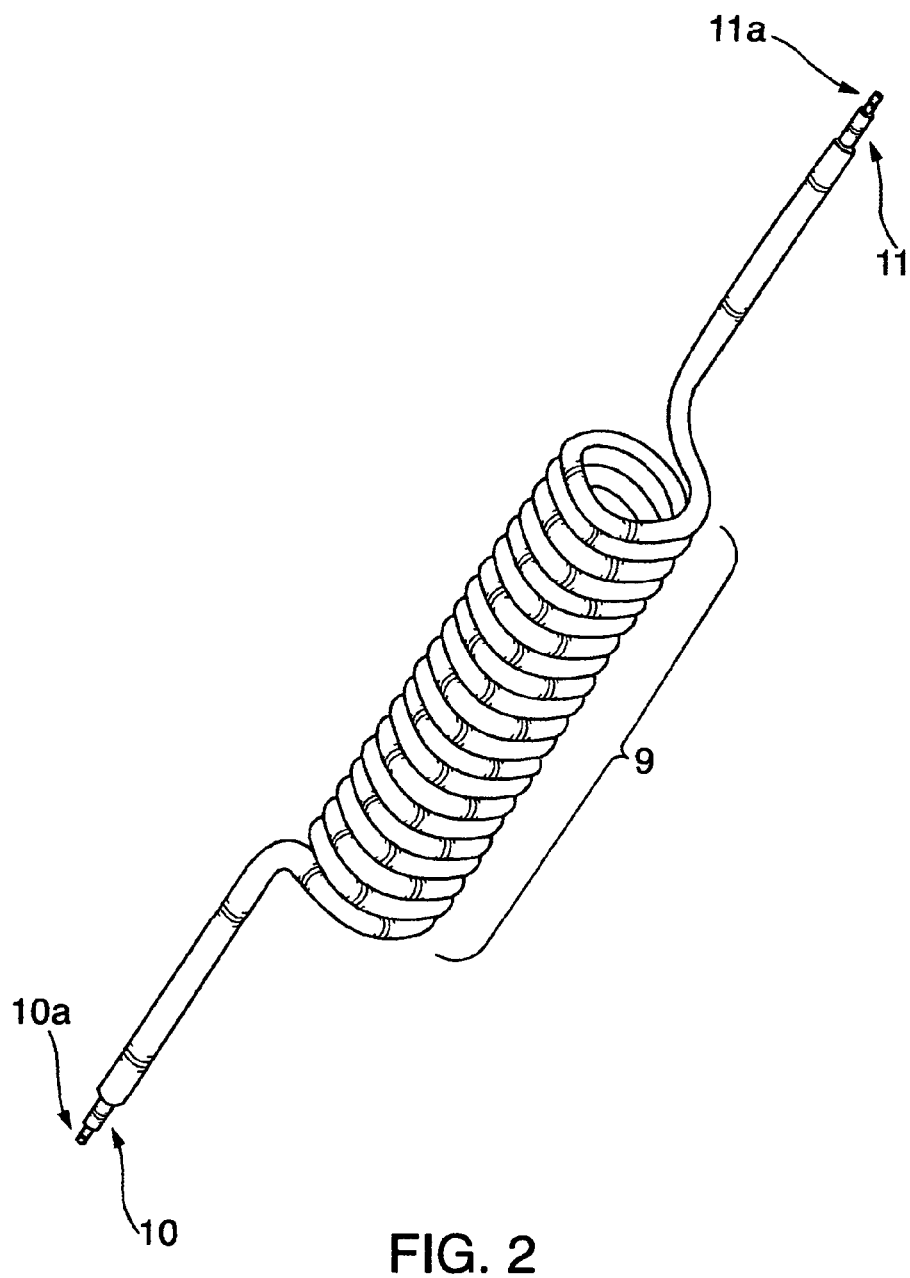
FIG. 2 is a pictorial drawing of a cord that is typical of the cords used by emergency responders such as first responders to connect the voice microphone to the communications system carried by said responder.

FIG. 2 is a pictorial showing of a typical connector cord that might be used to connect the radio or communications transmitter to the microphone which might be placed, for convenience sake, up near the mouth of the first responder user. In this figure the cord is shown in a coiled position at 9 so that it can be drawn out for use. Two ends 10 and 11 are shown. One will be attached to the microphone and the other to the communications transmitter. The cross-cut view of FIG. 1 is taken across the cord at either end. Wires are shown at 10*a* and 11*a*.

The communications systems used within this invention are all well-known and widely used within the first responder industry. The materials of construction are also well known and even some of the materials used to provide extra fire resistance have been used as materials of construction in that same industry. The difference, however, is the combination necessary not only to provide the requisite fire and heat resistant insulation materials but also an extinguishing formulation one of which has been modified per this invention, that allows the cord to maintain electrical functionality after exposure to temperatures of at least 500° F.

The transmitting equipment can achieve a certain amount of resistance to fire since it is usually carried under any fire-fighting wear. But, the exterior cords or cables to the microphone are exposed and thus these materials need to be heat and fire-resistant.

Figure 3:
FIG. 3 is a pictorial drawing illustrating the cord or cable of this invention attached to a typical fire first-responder's radio equipment and with that equipment attached to the fire first-responder's safety clothing.

FIG. 3 is a pictorial showing of a typical fire first-responder dressed so as to enter the fire zone and carrying the appropriate communications equipment that he needs to have in order to pass on emergency data. In this figure a firefighter completely clothed and ready to enter into the fire area is shown as 12 and his microphone which will transmit via a radio carried down and back and not particularly in view in this figure, is shown as 13. The coiled cord which connects the microphone to the radio and which is the cord of this invention is shown as 14. This is the cord that is shown within FIG. 1.

Preferred Formulae for this Invention

A particularly preferred modified polychloroprene rubber-like material has been produced within the ambit of this invention from the following ingredients wherein PHR stands for Parts per Hundred Rubber and wherein "rubber" refers to the whole formulation formed from this mixture:

| Material | PHR (Range) | Preferred PHR |
|---|---|---|
| Polychloroprene | 100 | 100 |
| Carbon Black N330 | 14.25 to 15.75 | 15 |
| Octylated diphenylamines | 2.14 to 2.36 | 2.25 |
| Fatty Acid | 0.33 to .37 | 0.35 |
| Magnesium Oxide | 3.8 to 4.2 | 4 |
| Zinc oxide | 7.6 to 8.4 | 8 |
| 3-methyl-thiazolidine-thione-2 | .95 to 1.05 | 1.0 |
| Aluminum Trihydrate | 57 to 63 | 60 |
| Silicon Dioxide | 14.25 to 15.75 | 15 |
| Zinc Borate | 4.75 to 5.25 | 5 |
| Antimony Oxide | 6.65 to 7.35 | 7 |
| Chlorinated Paraffin | 6.65 to 7.35 | 7 |
| 1,4-Benzenediamine, N,N'-mixed Phenyl and tolyl derivatives | 1.9 to 2.1 | 2 |
| Polyethylene Glycol | 1.43 to 1.58 | 1.5 |
| Polyethylene homopolymer | 4.75 to 5.25 | 5 |

A description of the various components from above is as follows:

The Polychloroprene component is a compound entitled "Neoprene GRT" which is a product from E. I. DuPont deNemours & Co. and is a sulfur modified crystallization resistant chloroprene copolymer stabilized with a thiuram disulfide and a non-staining antioxidant. Although we used this particular Polychloroprene other manufacturers furnish similar formulae all of which can be used herein.

Carbon Black Grade N 330 is a reinforcing filler to increase compound strength and resistance to wear.

Oxylated diphenylamine is an antioxidant and is an Agerite Stalite.

A fatty acid (stearic acid) is added to activate the cure.

Magnesium oxide helps prevent premature curing of the product.

Zinc oxide is a curing/crosslinking activator.

3-methyl-thiazolidine-thione-2 is used to accelerate vulcanization—curing

The Aluminum Trihydrate is a flame retardant.

Amorphous silicon dioxide granule is reinforcing filler to increase compound wear resistance.

Zinc Borate, Antimony Oxide and Chlorinated Paraffin are flame suppressants.

1,4-Benzenediamine, N,N'-mixed Phenyl and tolyl derivatives is an anti-oxidant.

The polyethylene glycol is added to activate the cure.

Polyethylene is used for lubrication.

EXAMPLES

Example 1

In a test run to see how effective the cords or cables of this invention were resistant to high heat from a heat from fire, as opposed by standard material available on the market, a test procedure was set up. In this procedure, a vertical test structure that permits one to hang up a coil cord similar to that described above, was placed within an oven preheated to 500° F. A coiled cord mounted on the test structure and stretched out to 15 inches by making the bottom attachment to permit such a stretch, was placed inside the oven and the temperature allowed to return to 500° F. (ramp up was <30 seconds). The test structure was set up so the coiled part of the cord was located near the thermocouple in the oven: Cord was conditioned at this temperature for 5 minutes and then withdrawn from the oven and permitted lie on a flat surface. A 500 volt DC potential was applied between all conductors to shield and then all conductors to each other. This cycle was repeated 10 times on the same cord. The cord representing this invention passed this test after each cycle and the test was stopped at 10 cycles. A similar test was run using a conventional coiled cord element designed for use with a portable, hand-held land mobile radio and currently used within the industry and currently on the market. Two of these connectors were tested and both failed completely after the first cycle described above indicating that they were not heat resistant.

Example 2

In order to test the fire resistance of yet another conventionally available cord very similar in shape and construction to the type described herein and made by Motorola Corp., and said to be "resistant to heat", was tested to a Vertical Flame Test UL 2556 page 120. The competitor's cord failed completely and was almost consumed by the heat of the test whereas the cord of this invention exceeded the specification whereas the flame extinguishes immediately upon removal of the flame source. The outer jacket of the failed element is standard and commercially available chlorinated polyethylene (which would have replaced the polychloroprene shown as item 8 in FIG. This material is inherently fire resistant but cannot survive in the above referenced test procedure. Thus, I have modified the overall formula as described above and the element prepared therefrom will indeed survive the stringent aforementioned test.

I claim:

1. A heat resistant cable or cord connecting element having two ends, one end being connected to a communications transmitter and the second end being connected to a microphone or other voice transmitting device whereby said cable or cord connector comprises a series of wire transmitting elements wherein each of said wire transmitting elements enclosed therein, and a layer of a tightly wound metallic closely formed wire sheath is formed around all of the series of wires followed by a polychloroprene rubber layer surrounding said sheath and all of said wire systems so that a degree of fire retardancy and fire extinguishing ability will be provided and wherein said polychloroprene rubber layer is manufactured from the following ingredients:

| Material | PHR (Range) | Preferred PHR |
|---|---|---|
| Polychloroprene | 100 | 100 |
| Carbon Black N330 | 14.25 to 15.75 | 15 |
| Octylated diphenylamines | 2.14 to 2.36 | 2.25 |
| Fatty Acid | 0.33 to .37 | 0.35 |
| Magnesium Oxide | 3.8 to 4.2 | 4 |
| Zinc oxide | 7.6 to 8.4 | 8 |
| 3-methyl-thiazolidine-thione-2 | .95 to 1.05 | 1.0 |
| Aluminum Trihydrate | 57 to 63 | 60 |
| Silicon Dioxide | 14.25 to 15.75 | 15 |
| Zinc Borate | 4.75 to 5.25 | 5 |
| Antimony Oxide | 6.65 to 7.35 | 7 |
| Chlorinated Paraffin | 6.65 to 7.35 | 7 |
| 1,4-Benzenediamine, N,N'-mixed Phenyl and tolyl derivatives | 1.9 to 2.1 | 2 |
| Polyethylene Glycol | 1.43 to 1.58 | 1.5 |
| Polyethylene homopolymer | 4.75 to 5.25 | 5. |

2. The cable or cord element of claim 1 wherein said cable or cord is resistant to high heat of at least 500° F.

3. A process for preparing a heat resistant shield for the outer covering of the cable or cord of claim 1 wherein a polychloroprene rubber is formed by mixing and polymerizing the following ingredients to subsequently form said outer covering:

| Material | PHR (Range) | Preferred PHR |
|---|---|---|
| Polychloroprene | 100 | 100 |
| Carbon Black N330 | 14.25 to 15.75 | 15 |
| Octylated diphenylamines | 2.14 to 2.36 | 2.25 |
| Fatty Acid | 0.33 to .37 | 0.35 |
| Magnesium Oxide | 3.8 to 4.2 | 4 |
| Zinc oxide | 7.6 to 8.4 | 8 |
| 3-methyl-thiazolidine-thione-2 | .95 to 1.05 | 1.0 |
| Aluminum Trihydrate | 57 to 63 | 60 |
| Silicon Dioxide | 14.25 to 15.75 | 15 |
| Zinc Borate | 4.75 to 5.25 | 5 |
| Antimony Oxide | 6.65 to 7.35 | 7 |
| Chlorinated Paraffin | 6.65 to 7.35 | 7 |
| 1,4-Benzenediamine, N,N'-mixed Phenyl and tolyl derivatives | 1.9 to 2.1 | 2 |
| Polyethylene Glycol | 1.43 to 1.58 | 1.5 |
| Polyethylene homopolymer | 4.75 to 5.25 | 5. |

4. The heat resistant cable or cord element of claim 3 wherein said cable or cord immediately self-extinguishes after exposed to fire.

\* \* \* \* \*